United States Patent Office 3,208,988
Patented Sept. 28, 1965

3,208,988
POLYMERIZATION OF ISOPRENE USING A HYDROCARBON POLYLITHIUM CATALYST
Lawrence E. Forman, Akron, Richard W. Kibler, Cuyahoga Falls, and Francis A. Bozzacco, Massillon, Ohio, assignors to The Firestone Tire & Rubber Company, Akron, Ohio, a corporation of Ohio
No Drawing. Filed Oct. 24, 1961, Ser. No. 147,138
15 Claims. (Cl. 260—94.2)

This invention relates to a method for producing synthetic rubbery polyisoprene having physical and chemical properties similar to those of natural rubber. The present application is a continuation-in-part of the applicants' earlier application, Serial No. 683,233 filed September 11, 1957, which in turn is a continuation-in-part of the applicants' still earlier application, Serial No. 535,525 filed September 19, 1955.

It is well known that Hevea natural rubber is essentially a polyisoprene, containing small amounts of proteins and other substances derived from the rubber tree. Natural rubber is characterized by possessing excellent tack, especially after milling; producing vulcanizates having excellent resilience and low hysteresis properties, high tensile strength and good flexibility at low temperatures; producing gum vulcanizates of high tensile strength; and displaying a crystalline structure when stretched. Heretofore all hydrocarbon synethic rubbers, in comparison with natural rubber, have shown no crystalline properties, extremely low gum tensile strengths, relatively high hysteresis and low resilience. Although these synthetic rubbers have generally been superior to natural rubber in resisting crack initiation in service, they have been very much inferior in resisting cut growth. The relatively high hysteresis of thes synthetic rubbers prevents their use in substantial quantities in production of large tires such as those used on trucks and large off-the-road vehicles.

During the latter part of the past century it was recognized that Hevea natural rubber is a polymer of isoprene, and various attempts were made to produce a true synthetic rubber by polymerizing isoprene. None of these attempts were successful, because the rubbery products obtained possessed properties much inferior to those of natural rubber. Furthermore the polymerization processes were extremely slow, and the rubbery products were mere laboratory curiosities. Butadiene and its homologs were polymerized to produce synthetic rubbers of various types during the early part of the present century, but no commercially acceptable synthetic rubber was produced until about 25 years ago, with the development in Germany of the Buna rubbers (from butadiene-1,3) and in this country of neoprene (from chlorobutadiene). Large scale commercialization of hydrocarbon synthetic rubbers during the past 20 years has been mostly in the field of emulsion polymerization, although the emulsion polymerization technique has never resulted in a hydrocarbon synthetic rubber approaching natural rubber in both gum tensile and hysteresis properties.

It is an object of the invention to provide a synthetic rubber possessing the desirable properties of natural rubber, and especially low hysteresis and high gum tensile strength properties.

Another object is to provide a synthetic rubber possessing the desirable good properties of natural rubber and also some of the unique good properties of synthetic rubbers.

Another object is to provide a method of making the improved synthetic rubbers just mentioned.

A further object is to provide a synthetic rubber capable of replacing, if desired, all natural rubber in critical uses during times of emergency such as in war times.

Other objects of the invention will become apparent as details of the invention are set forth.

SYNOPSIS OF THE INVENTION

In an investigation in which the present applicants have been associated, it was discovered that hydrocarbon lithium compounds could be employed as catalysts in the polymerization of isoprene and, when so used, resulted in polymers having physical, chemical and structural characteristics substantially the same as Hevea natural rubber. By the present invention it has been further discovered that hydrocarbon polylithium compounds may also be used as catalysts for the polymerization of isoprene, and when so used, will bring about a much more rapid polymerization reaction and will result in polymers having (in addition to the excellent properties of the polymers produced by the generality of lithium compounds) substantially higher molecular weights. The reaction may be carried out by mass polymerization techniques, in which the isoprene, in substantially undiluted form, is contacted with the hydrocarbon lithium catalyst, or by solution techniques, in which the isoprene is dissolved in a suitable inert solvent and contacted with the catalyst. The temperature may vary over a wide range, say from −100° C. to 150° C., and preferably from −40° to 80° C. The isoprene may be in the liquid or vapor phase, depending on the temperature and pressure employed.

THE HYDROCARBON POLYLITHIUM CATALYSTS

The hydrocarbon polylithium compounds employed as catalysts in the practice of this invention may be any hydrocarbon containing from 1 to 40 carbon atoms in which lithium has replaced a plurality of hydrogen atoms. Suitable hydrocarbon polylithium compounds include for instance alkylene dilithium compounds such as methylene dilithium, ethylene dilithium, trimethylene dilithium, tetramethylene dilithium, pentamethylene dilithium, hexamethylene dilithium, decamethylene dilithium, octadecamethylene dilithium, 1,2-dilithium, propane and the like. Also suitable are polylithium aryl, aralkyl and alkaryl compounds such as 1,4-dilithium benzene, 1,5-dilithium naphthalene, 1,2-dilithium-1,3-triphenyl propane, the compound of the formula

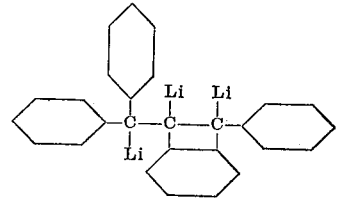

and the like. Tri- and higher lithium hydrocarbons may also be used, such as 1,3,5-trilithium pentane or 1,3,5-trilithium benzene. It will be understood that mixtures of hydrocarbon polylithium compounds individually suitable as above indicated may be used. Likewise, the hydrocarbon polylithium catalysts of this invention may be used in combination with other lithium-dependent catalysts such as hydrocarbon monolithium compounds or metallic lithium itself.

Unlike the hydrocarbon-metal compounds of the alkali metals other than lithium, the catalytic action of the hydrocarbon polylithium catalysts employed in this invention does not appear to be affected by the presence of other alkali metal salt compounds. For instance, in the synthesis of hydrocarbon alkali metal compounds, alkali metal halides are produced as by-products. In the catalysis of polymerization with hydrocarbon-metal derivatives of metals other than lithium, these extraneous salts exert considerable, and in many cases essential, effects. In the practice of the present invention, it does not appear that these extraneous salts have any effect whatsoever; they may be left in the hydrocarbon polylithium catalyst, or allowed to settle out, without noticeably changing the action of the catalyst.

The hydrocarbon polylithium catalysts of this invention may also be used in conjunction with other lithium-dependent catalysts. For instance, in investigations in which the present applicants have been associated, it was discovered that lithium metal, monolithium hydrocarbons, or lithium aryl amides will catalyze the polymerization of isoprene to produce polymers similar to Hevea rubber. The hydrocarbon dilithium compounds may be used in admixture with these other catalysts, and when so used will produce polymers of the desirable character of this invention.

THE CONCENTRATION OF CATALYST

As to the amount of catalyst to be used, in general when the reaction is conducted with the isoprene in the liquid phase, i.e., in liquified pure form or dissolved in liquid solvents, the larger the amount of catalyst used, the more rapidly the polymerization will proceed. Countervailing this desirable effect, high concentrations of catalysts tend to lower the molecular weight of the polymers and also spoil the microstructure of the polymeric chains. Based on these considerations, the amount of catalyst employed should be such as to contain not more than 0.1 gram, and preferably not more than 0.02 gram, of carbon-linked lithium, expressed as metallic lithium, per 100 grams of isoprene in the polymerization mixture. There appears to be no theoretical lower limit to the amount of catalyst used; at low concentrations, the catalysts appear to have a high order of efficiency, i.e., if the reaction environment is scrupulously purged of all contaminants such as oxygen, ozone, water, carbon dioxide, etc., which would react with and consume the catalyst, the catalyst appears to be used principally in the production of polymer chains so that, as long as any catalyst is present, some degree of polymerization will take place. For economic reasons of obtaining a rapid reaction rate and optimum reactor utilization, it is preferred to have at least 0.00002 gram of carbon-bonded lithium present per 100 grams of isoprene. The above concentrations are, of course, expressed on the basis of catalyst effectively present in the polymerization mass; if substances which will react with and destroy the catalyst are permitted to enter the reaction zone, the amount of catalyst so destroyed must be subtracted from that supplied in applying the above criteria.

For the purpose of establishing the effective concentration of carbon-linked lithium in any catalyst preparation employed in the practice of this invention, the differential titration technique of Gilman and Haubein J. Am. Chem. Soc. 66; 1515 (1944) has been found the most suitable procedure, and the concentrations referred to hereinabove and in the claims are to be applied on the basis of analyses made by this method, if any question arises on this point. For most practical purposes, where side reactions are not suspected, simple titration with acid will give reasonably accurate results.

When the polymerization is conducted in the vapor phase, overt concentration considerations are without significance, and the isoprene and catalyst may be supplied in any ratios whatsoever.

THE MICROSTRUCTURE OF PRODUCTS PRODUCED IN ACCORDANCE WITH THE INVENTION

It is understood that Hevea rubber (as well as Balata) molecules possess essentially a 1,4-structure, which means that the isoprene units of the molecules are connected to each other as a result of 1,4-addition to produce a linear chain. Each isoprene unit in a molecular chain contains a $$-\overset{|}{C}=\overset{|}{C}-$$

group in the center portion thereof. Since this ethylene group is unsymmetrical, both cis and trans isomers are possible. It has been understood for some time that the Hevea rubber molecules are essentially cis in structure, whereas the Balata molecules are essentially trans. As is well known, Hevea rubber is very "rubbery," whereas Balata is quite resinous in its properties.

Recent infra-red studies have shown Hevea rubber to consist of about 97.8% cis-1,4-structure and about 2.2% 3,4-structure; Balata consists of about 98.7% trans-1,4-structure and about 1.3% 3,4-structure. Typical of GR–S emulsion polymers is the structure of 64% trans-1,4-, 18% cis-1,4- and 18% 1,2-. Rubbery emulsion polyisoprenes generally contain 65% or more of trans-1,4-structure.

The polyisoprene synthetic rubbers produced in accordance with this invention, similarly to Hevea, are essentially linear cis-1,4- polymers. The exact structure of the polymers depends considerably upon the purity of the monomer and the polymerization techniques employed. Isoprene of high purity should be used. The synthetic rubbers show by infra-red technique at least about 75% cis-1,4-structure, no more than about 7 to 10% trans-1,4-structure, no more than about 10% 3,4-structure and essentially no, or at the most only very little, 1,2-structure. The preferred synthetic rubbers produced in accordance with this invention exhibit, by infra-red technique, 90 or more percent cis-1,4-structure, no, or essentially no, trans-1,4-structure or 1,2-structure and no more than about 10% 3,4-structure. Perbenzoic acid oxidation results indicate a typical rubber produced by the invention to possess 94.3% 1,4-structure and Hevea rubber to possess 97.1% 1,4-structure. Total unsaturation, determined by iodine monochloride, for Hevea (pale crepe) was 96% and for a typical synthetic rubber produced in accordance with this invention was 98%.

The proportions of the cis-1,4-, trans-1,4-, 1,2- and 3,4-unsaturation in the polymers produced in accordance with this invention are best determined by means of infra-red analysis. The relative amounts of the four structures named are found by measuring the intensities of the infra-red absorption bands at 8.85, 8.68, 10.98 and 11.25 microns for the four types of structures, in the order given above, and inserting these values into the equation:

$$D^i = e^i_1 C_1 + e^i_2 C_2 + e^i_3 C_3 + e^i_4 C_4$$

where:

$D^i$=absorbance (optical density) of the polymer at wavelength $i$ $e^i_{1,2,3 \text{ or } 4}$=the absorptivities of the several structures at wavelength $i$, the subscripts 1,2,3 or 4 referring to the several component structures, and $C_{1,2,3 \text{ or } 4}$=the concentrations of the several structures, the subscripts 1,2,3 or 4 referring to the several component structures.

The four equations obtained in this way were solved for $C_1$, $C_2$, $C_3$ and $C_4$, the values of the concentrations of the cis-1,4-, trans-1,4-; 1,2-addition and 3,4-addition of the polymer.

The peak wavelengths selected, and the values of the absorptivities $e^i$ for these wavelengths for the several structures, are tabulated herewith:

MOLAR ABSORPTIVITIES $e^i$ AT WAVELENGTH OF STRUCTURE

| | 8.68 microns | 8.85 microns | 10.98 microns | 11.25 microns |
|---|---|---|---|---|
| 1,2-Addition | 3.0 | 3.0 | 149.0 | 9.0 |
| 3,4-Addition | 1.5 | 2.0 | 7.0 | 145.0 |
| Cis-1,4-Addition | 3.583 | 6.518 | 1.860 | 1.530 |
| Trans.-1,4-Addition | 5.927 | 1.934 | 2.277 | 1.885 |

In the detailed examples given hereinafter, percentage values are given for the various types of unsaturation. These are derived by dividing the absolute concentration of each type of unsaturation by the sum of the concentrations of the four types of unsaturation (1,2-; 3,4-; cis- and trans-) determined, and multiplying by 100%, so that the sum of the percentages given will always be 100%. In order to assess the accuracy of the determination, a further figure is given, namely total unsaturation found. This is the quotient of the sum of the concentrations of the various types of unsaturation found by infrared analysis, divided by the theoretical concentration of all unsaturation which should be present in the sample, assuming that the polyisoprene is constituted solely of

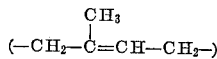

units.

Both liquid phase and vapor phase polymerizations have been successfully utilized in producing new synthetic rubbers by the process of this invention. The polymerization temperatures can range as high as 150° C. or as low as —100° C. As explained hereinafter the reaction rate increases with increasing temperature and with increasing purity of the monomer. Accordingly, if a given reaction rate is required, purity and temperature will be inverse functions of each other—the higher the purity, the lower the temperature required and vice versa. Generally, a sufficiently pure isoprene should be used so that polymerization temperatures no higher than about 70° to 90° C. may be employed. Important factors influencing structure of the polymer and speed of the reaction are:

(1) Purity of monomer
(2) Purity of catalyst
(3) Concentration of moisture, air and oxygen
(4) Temperature of reaction

*Purity of monomer*

It has been pointed out previously that isoprene of high purity is required to produce the polymers of the invention. By isoprene of high purity is meant an isoprene of at least more than 90 mole percent purity and preferably in the neighborhood of 95 or more mole percent purity. In general, the purer the isoprene, the faster the reaction rate and the closer the structure and the properties of the resulting polymer to natural rubber. Acetylenic compounds containing hydrogen on a triplybonded carbon atom are acidic in character, and react directly to destroy the catalyst with production of acetylides; these compounds should be kept at a minimum or removed. Other unsaturated compounds, such as acetylenic compounds containing no hydrogens on the double bonds; olefines; and conjugated diolefins other than isoprene do not so actively harm the reaction; but they do use up a certain amount of catalyst; some of them tend to polymerize or copolymerize and to that extent spoil the micro-structure of the polymer, and to some extent they lower the molecular weight of the resulting polymer. It is therefore highly recommended that these compounds be removed as far as possible. Any inhibitor normally present in a commercial isoprene must be removed by conventional technique prior to polymerization in accordance with the invention. Excellent polymers in accordance with the invention are produced from Pure Grade[1] or Research Grade[2] isoprene. The only purification required of these monomers prior to use is removal of inhibitor therefrom. Desirable polymers in accordance with the invention are also produced from a less pure grade of isoprene[3]

---

[1] Supplied by Phillips Petroleum Company, Bartlesville, Oklahoma and represented as having a purity of 99 mole percent and a refractive index at 20° C. of $n_D^{20}=1.422$.
[2] Supplied by Phillips Petroleum Company and represented as having a purity of 99.6 mole percent and a refractive index at 20° C. of $n_D^{20}=1.422$.
[3] Supplied by Enjay Company, Inc.

which has a purity of about 91–93% and contains minor amounts of alkyl acetylenes and various other unsaturates, provided the acetylenic compounds are removed and the unsaturated impurities are reduced by well known chemical and fractionating methods to produce a monomer having a purity of about 95% and an index of refraction at 20° C. in the range of about $n_D^{20}=1.4210$ to $1.4216$. In the examples below, isoprene of the above standards of purity was used.

*Concentration of moisture, air and oxygen, etc.*

Moisture in the polymerization zone, since it tends to use up catalyst, should be kept at a minimum. Oxygen and other components of the atmosphere have been found to inhibit polymerization and consequently should as nearly as possible be kept out of the reaction zone. These gaseous materials are conveniently removed by bringing the polymerization charge to a boil and venting a portion (e.g. about 10%) of the charge from the polymerization vessel prior to sealing the same and effecting polmerization. Particularly to be avoided is the presence of oxygenated and nitrogenous organic compounds such as ethers, esters, aldehydes, ketones, primary and secondary amines and the like, which are usually considered essential components of alkali metal catalyst systems: these compounds should be rigorously excluded from the reaction mixtures of this invention. It will be understood that all of the components entering the reaction chamber—monomeric isoprene, catalyst, solvents, equipment components, etc.—should be free from the deleterious materials discussed in the present paragraph and in the preceding paragraph on "Purity of Monomer" so as not to render useless the precautions for purity recommended.

*Temperature*

It has been found that the molecular weight and proportion of cis-1,4-structure of the polymers in accordance with the invention generally increase as the temperature of polmerization is decreased. Additionally, the reaction is quite difficult to control at elevated temperatures, particularly where isoprene of the preferred highest purity is employed. It has been found that the gel content of the polymer increases as the polmerization temperature increases especially when lithium dependent catalysts are employed. Consequently, it is desirable to operate at the lowest temperature at which a practical yield of the desired product can be obtained. Since polmerization reactions of the type contemplated frequently require a considerable induction period, it is often desirable to initiate the polmerization reaction at a higher temperature, i.e., at a temperature in excess of 30° C., and then lower the temperature to the desired level by suitable cooling means once the polymerization reaction has been initiated. In this manner, the induction period is lessened and the benefits of low temperature polymerization, as above indicated, are obtained. In general, the polyisoprenes of the invention are produced at temperatures between —100° C. and 150° C. A polymerization temperature of from —40 to 80° C. is preferred.

*Solvents*

In accordance with the invention, the pure isoprenes essential to the invention may be polymerized in either liquid or vapor phase, but desirably will be carried out in the presence of a suitable inert organic solvent. Solvents operable in the process whereby the polymers of this invention are produced must be non-polar, non-acidic, organic substances. Suitable solvents include the saturated aliphatic hydrocarbon solvents, such as the straight and branched chain paraffins and cyclo-paraffins containing from 3 to 16 carbon atoms which include, without limitation, propane, pentane, hexane, petroleum ether, heptane, dodecane, cyclopentane cyclohexane, methyl cyclohexane and the like. Aromatic solvents such as benzene, toluene, xylene and the like are also operable. The same considerations as to purity and absence of interfering compounds applying to the isoprene monomers also apply to the solvent. A treatment which has been found particularly advantageous for the purification of paraffin solvents, such as petroleum ether, consists in agitating the solvent with concentrated sulfuric acid and thereafter repeatedly washing with water. The solvent may then be suitably dehydrated by passage through silica gel, alumina, calcium chloride or other dehydrating or absorbing media, and therafter distilled. As in the case of the isoprene monomer, the solvent after being purified desirably should be handled in contact only with its own vapor or with atmospheres containing only its vapor and inert gases such as helium and argon.

Polymerization and polymer recovery operations

For small scale laboratory preparations, the polymerization reactions may conveniently be carried out in glass bottles sealed by crown caps lined with aluminum foil or other flexible, inert sheet material. Before use, the bottles should be dried, for instance by flaming and flushing with helium, argon or other inert gas. It is often desirable, even though the isoprene and solvent (if used) have been previously purified, to subject the materials to a last purification before charging, as for instance by passage through a silica gel adsorption column during the charging. Preferred solvents are aliphatic and aromatic hydrocarbon solvents such as pentane, hexane, heptane, petroleum ether, benzene, cyclopentane and the like. An atmosphere of inert gas such as helium, argon or the like is preferably maintained in the bottle during the charging, to avoid contact of oxygen with the monomer, and it will usually be desirable to complete the purging of oxygen from the system by allowing a portion of the isoprene to evaporate with the bottle loosely capped. The catalyst, which will usually be in the form of a readily flowable solution or suspension of the hydrocarbon lithium, is usually introduced last, just before sealing the crown cap. A hypodermic syringe is a convenient instrument for the handling of the catalyst, since it will keep the catalyst out of contact with the atmosphere. The sealed bottle may either be placed on a polymerizer wheel, arranged to dip and revolve the bottle in a water bath at the desired polymerization temperature; or, after brief shaking or other agitation to mix the catalyst with the other ingredients, the bottle may be allowed to stand quiescent in a medium maintained at the desired polymerization temperature. The polymerization will usually be complete in from 3 to 60 hours, depending on the temperature, catalyst concentration and other pertinent conditions. It is usually necessary to cut open the bottle to remove the polymer. Since the polymer contains no antioxidants, it is extremely susceptible to oxidation. A preferred method of shielding the polymer from oxidation consists in dropping it into a methanol, isopropanol or other alcoholic solution of an antioxidant and agitating the mixture. The alcohol serves as a vehicle for distributing the antioxidant, as an agent to destroy the catalyst, and causes the polymer to separate out from any solvent used in the polymerization mass. The separated polymer is then preferably washed with water on a roll mill, usually with addition of further stabilizing agents, and dried.

Corresponding techniques should be used in large scale polymerizations according to this invention. Usually the reaction will be carried out in a closed autoclave provided with a heat-transfer jacket and with a rotary agitator. Avoidance of oxygen contamination is most easily secured by evacuating the vessel prior to charging the isoprene and solvent (if used) and evaporating and venting a portion of the charge to sweep out any traces of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. It is desirable to provide a reflux condenser to assist in the reguluation of the reaction temperature, which will usually be maintained between 0° and 150° C.; preferably between —40° and 80° C. Upon completion of the polymerization, the polymerization mass is removed, immersed under the surface of a body of methanol, isopropanol or other alcohol containing an antioxidant, and agitated therewith to precipitate the polymer, destroy the catalyst and incorpate the antioxidant. The precipitated mass may be milled with water on a wash mill to remove the alcohol, additional antioxidant being incorporated during this operation. The product is then dried for storage and use.

The polymers produced in accordance with this invention have the advantageous tack and other working properties of natural Hevea rubber, and when cured with vulcanizing agents customarily used with natural Hevea rubber, yield vulcanizates having tensile strength, both at normal and elevated temperatures, low internal friction, and other physical properties substantially equalizing those of natural Hevea rubber. They may therefore be substituted in all uses for which Hevea natural rubber has heretofore been used, such as pneumatic tires, in particular truck tires, belting, electrical insulation, and the like.

With the foregoing general description in mind, there are given herewith detailed examples of the practice of this invention. All parts given are by weight. In Examples I–VI, the amounts of lithium catalysts used in polymerization are calculated on the basis of lithium entering the synthesis of the catalyst; in Examples VI–X the amounts of lithium used in the polymerization are calculated from the concentration of carbon-linked lithium, expressed as lithium metal, determined by titration of the catalyst preparation with acid.

EXAMPLE I

Pentamethylene dilithium catalyst (A) PREPARATION OF CATALYST

Lithium dispersion (35% dispersion in white petrolatum) _____ 19.8 grams (1.0 gram-atom).
Diethyl ether _____ 500 ml.
Pentamethylene dichloride _____ 35.2 grams (0.25 mol).

The apparatus used for the preparation comprised a one-liter three-necked flask having a high-speed stirrer, a dropping funnel, and a reflux condenser on the respective three necks. The stirrer was provided with an inlet for introducing helium into the interior of the flask. The apparatus was flamed and flushed with helium for 30 minutes before charging. A constant small stream of helium was continuously passed into the reactor during the manipulations described hereafter.

The lithium dispersion and ether were charged into the flask, and stirring commenced and maintained throughout the procedure to follow. The pentamethylene dichloride was added dropwise through the funnel over a period of three and one-half hours, the temperature of the batch being adjusted in accordance with the following schedule:

| Time Since Start (min.) | 0 | 5 | 10 | 25–210 |
|---|---|---|---|---|
| Temperature (° C.) | 20 | 0 | —5 | 20–25 |

The reaction mixture was then transferred by helium pressure into a one-liter distilling apparatus in which the ether was distilled off while n-heptane was simultaneously added dropwise. The ether was distilled off down to a pot temperature of 25° C. at 150 mm., which conditions were maintained until 250 ml. of n-heptane was also distilled to scavenge out the last traces of ether. The residue was then pressured by helium over into a storage bottle, and the volume made up to 800 ml. by addition of n-heptane so that the solution contained .0087 gram of lithium per ml.

(B) POLMERIZATION

| | |
|---|---|
| Isoprene | 100 grams. |
| n-Pentane | 200 grams. |
| Pentamethylene dilithium catalyst (prepared as just described) | 0.026 gram (as lithium). |

The above ingredients were charged into a 28-ounce beverage bottle previously flushed with argon, and the bottle sealed and tumbled in a water-bath at 50° C. for 16 hours. At the end of this time the bottle was cooled and opened, and the polymer coagulated from the solution by the addition of isopropanol. The coagulated polymer was washed on a washing mill, 3% of an amine-type antioxidant was added to the polymer on the mill, and the milled polymer was dried under vacuum at 50° C. The resultant polymer had an inherent viscosity of 18.9 and zero gel content. By way of comparison, an otherwise similar run using amyl lithium as a catalyst resulted in a polymer having an inherent viscosity of 4.1. Infrared examination of the present polymer showed 92.3% cis-1,4-; and 7.7% 3,4-unsaturation, the total unsaturation found being 88.3%.

(C) COMPOUNDING AND VULCANIZATE PROPERTIES

The above procedure was repeated a number of times in order to provide sufficient material for tests. The polymer was compounded, vulcanized and tested, in parallel with Hevea rubber in accordance with the formulation set out in Table I, both compounds being vulcanized at 280° F. for one hour. The slight compounding differences between the two stocks represent adjustments made to secure optimum performance in each case.

*Table I*

| Ingredients | Hevea Stock Parts | Polyisoprene Stock Parts |
|---|---|---|
| Hevea rubber | 100 | |
| Polyisoprene (prepared as above described) | | 100 |
| Carbon black | 50 | 50 |
| Zinc oxide | 3 | 3 |
| Stearic acid | 2.6 | 2.6 |
| Softener | 3.0 | 3.0 |
| Antioxidant | 2.5 | 1.6 |
| Accelerator | .5 | .75 |
| Retarder | 1.0 | 1.0 |
| Sulfur | 2.6 | 2.5 |

*Table I—Continued*

| Properties | As cured | Aged 2 Days at 212° F. | As cured | Aged 2 Days at 212° F. |
|---|---|---|---|---|
| 300% modulus (lbs./sq. in.) | 1,700 | | 1,500 | 2,150 |
| Tensile strength (lbs./sq. in.) | 3,600 | 1,500 | 3,325 | 2,600 |
| Elongation, percent | 540 | 290 | 560 | 380 |
| Internal friction | 2.6 | | 2.4 | |
| Running temperature, °F | 245 | | 250 | |
| Blowout time (min.) | 15 | | 20 | |
| Ring Tensile Strength (lbs./sq. in.): | | | | |
| At 212° F | 2,025 | | 1,850 | |
| At 275° F | 1,400 | | 1,200 | |
| Tear Strength: | | | | |
| At 212° F | 568 | | 350 | |
| At 275° F | 448 | | 276 | |

EXAMPLE II

*Large scale run*

| | | |
|---|---|---|
| Isoprene | lbs | 35 |
| Petroleum ether | lbs | 105 |
| Pentamethylene dilithium catalyst (prepared as described in Example I–A) | ml | 400 |

For this run there was provided a 50-gallon nickel reactor provided with an anchor agitator, a heating and cooling jacket, a reflux condenser and provisions for introducing liquids and gases. The reactor was first thoroughly evacuated and the mixed isoprene and petroleum ether charged, the mixture being passed through a silica gel column before entering into the reaction vessel in order to remove any impurities which may have been carried through the previous purification processes. Agitation was commenced and the catalyst introduced. The temperature was adjusted to 40° C., these conditions being continued for 69 hours. At the end of this time the reaction mixture was cooled down and the resultant polymer solution dropped into a vessel of isopropanol containing 3% of an amine-type antioxidant. The resultant coagulated polymer was washed with water on a large wash mill and 3% of an amine-type antioxidant added on the mill. The polymer had an inherent viscosity of 10.9; 1% gel; Mooney viscosity $ML_4$–212 of 66; and a Williams value $Y_3$–212 of 5.13 with a recovery of 0.86. Infra-red examination indicated 88.2% cis-1,4-; 4.4% trans-1,4-; and 7.4% 3,4-unsaturation, with a total unsaturation found of 89.0%.

The polymer prepared as above described was compounded, vulcanized and tested, in parallel with Hevea rubber, in accordance with the formulation in Table II. The close approach of the polyisoprene properties to those of Hevea rubber is quite remarkable, since this is a gum stock containing no carbon black.

*Table II*

| Ingredients | Hevea Stock Parts | Polyisoprene Stock Parts |
|---|---|---|
| Hevea rubber | 100 | |
| Polymer (prepared as just described) | | 100 |
| Zinc oxide | 5 | 5 |
| Lubricant | 1.1 | 1.1 |
| Sulfur | 3.0 | 3.0 |
| Accelerator | .75 | .75 |
| Antioxidant | | 1.6 |

| Properties | 600% Modulus, lbs./sq. in. | Tensile Strength, lbs./sq. in. | Elongation (Percent) | 600% Modulus, lbs./sq. in. | Tensile Strength, lbs./sq. in. | Elongation (Percent) |
|---|---|---|---|---|---|---|
| Cured at 260° for— | | | | | | |
| 45 minutes | 400 | 3,400 | 680 | 300 | 2,675 | 890 |
| 60 minutes | 600 | 3,250 | 640 | 400 | 2,975 | 860 |
| 90 minutes | 750 | 3,400 | 640 | 550 | 3,050 | 910 |

EXAMPLE III

Hexamethylene dilithium catalyst (A) PREPARATION OF CATALYST

| | |
|---|---|
| Lithium suspension (30% suspension in white petrolatum) | 23.3 grams (1.0 g. atom). |
| Diethyl ether | 500 ml. |
| Hexamethylene dibromide | 61 grams (0.25 mol). |

The apparatus of Example I-A was employed in the preparation. The apparatus was flamed and flushed with helium as before. The lithium suspension and diethyl ether were charged into the flask, stirring and slow introduction of helium commenced and was maintained throughout the following manipulations, and the hexamethylene dibromide introduced dropwise over a period of one hour, the time-temperature schedule of the batch being regulated as follows:

| Time Since Start (Min.) | 0 | 10 | 20 | 30 | 40 | 60 |
|---|---|---|---|---|---|---|
| Temperature (° C.) | 20 | 0 | −3 | −2 | 13 | 0 |

After the hexamethylene dibromide had all been added, the reaction mixture was stirred for an additional two hours at 25° C. The reaction mixture was then pressured over into a distilling apparatus (previously dried and flushed with helium), where the ether was distilled off under reduced pressure. Simultaneously a mixture of n-heptane and methyl cyclohexane (boiling range 60–95° C., previously purified by washing successively with concentrated sulfuric acid, water, sodium bicarbonate solution, and thereafter dried over magnesium sulfate and distilled over sodium sand) was added dropwise. The ether was distilled off down to a pot temperature of 45° C. at 100 mm. These conditions were maintained until about a liter of the heptane-cyclohexane mixture had distilled over as a chasing operation. The residue was then pressured into a storage bottle, and its volume made up to 690 ml. by addition of the heptane-cyclohexane mixture, equivalent to 0.0101 gram of lithium per ml. of the mixture.

(B) POLYMERIZATION

| | |
|---|---|
| Isoprene | 50 grams |
| Petroleum ether | 150 do |
| Catalyst (prepared as just described; contains .010 g. lithium per ml.) | 4 ml. |

The above ingredients were charged into a polymerizing bottle which was placed on a polymerizer wheel in a water bath maintained at 50° C. Polymerization was continued for 18 hours. The polymer was then removed from the bottle and worked up as described in Example I. Infra-red analysis indicated that the polymer contained the following unsaturation: 70.0% cis-1,4-; 19.4% trans-1,4-; and 9.4% 3,4-; total found 112.8%. The high value of total found unsaturation indicates the presence of interfering structures, and probably the ratio of cis- to trans-unsaturation was actually much better than above indicated.

EXAMPLE IV

Mixed dilithium and monolithium catalyst

| | |
|---|---|
| Isoprene | 40 pounds. |
| Petroleum ether | 120 pounds. |
| Amyl lithium (in solution in petroleum ether) | 5.4 grams. |
| Pentamethylene dilithium (in solution in petroleum ether) | 11.9 grams (as lithium). |

The procedure of Example II was repeated, using a mixture of the amyl lithium and pentamethylene dilithium in place of the catalyst of Example II. The polymerization was carried out for 35 hours at temperatures in the range of 85–100° F. The polymer produced had an intrinsic viscosity of 5.9, 1.5% gel and a Mooney plasticity ML$_4$–212 of 63. Infra-red analysis showed 90.2% cis-1,4-; and 9.4% 3,4-unsaturation, the total unsaturation found being 83.6%.

EXAMPLE V

Mass polymerization

| | |
|---|---|
| Isoprene | 100 grams. |
| Pentamethylene dilithium catalyst (prepared as described in Example I-A) | 0.026 gram (as lithium). |

The above ingredients were charged into a 28-ounce beverage bottle, and a portion of the isoprene permitted to evaporate to purge the bottle. The bottle was then capped and placed on a polymerizer wheel in a water bath at 50° C. for 18 hours. The bottle was then cut open to remove the polymer, which was quickly milled on a wash mill, 3 parts of mercaptobenzimidizole being added on the mill as an antioxidant. Infra-red examination indicated that the polymer contained 89.7% cis-1,4-; 4.1% trans-1,4-; 0.55% 1,2-; and 5.6% 3,4-unsaturation.

EXAMPLE VI

| | |
|---|---|
| Isoprene | 100 grams. |
| n-Pentane | 300 grams. |
| Lithium dispersion (33% dispersion in white petrolatum) | .44 gram. |
| Pentamethylene dilithium catalyst (prepared as described in Example I-A) | 0.0043 gram (as lithium). |

The isoprene and n-pentane were charged into a 28-ounce beverage bottle, and a small portion of the charge evaporated to purge the vessel. The lithium dispersion and pentamethylene dilithium catalyst were charged and the bottle sealed and placed on a polymerizer wheel at 50° C. for 24 hours. The polymer was coagulated and worked up as described in Example I. Infra-red data indicated that the polymer contained 94.7% cis-1,4-; 0.2% 1,2-; and 5.1% trans-1,4-unsaturation, the total found being 87.9%.

EXAMPLE VII

Tetramethylene dilithium large scale polymerization (A) PREPARATION OF CATALYST

| | |
|---|---|
| Lithium dispersion (34.5% dispersion in petrolatum) | 100.5 g. (5 gram-atoms). |
| Heptane | 1000 ml. |
| 1,4-dichlorobutane | 158.78 g. (1.25 gram-mol). |

A rocking bomb having an inside diameter of 7.6 cm., and an inside depth of 37.6 cm., charged with 40 one-half-inch steel balls and having a 90° swing with 36 cycles per minute was used in this preparation. The ingredients of the recipe were sealed into the bomb and rocked at 25° C. for 166 hours. The contents were then pressured into a storage bottle, previously flame-dried and flushed with argon. Titration with acid indicated a concentration of .014667 gram of carbon-linked lithium, expressed as lithium metal, per ml.

(B) POLYMERIZATION

| | |
|---|---|
| Isoprene (distilled over sodium) | 30 lbs. |
| Petroleum ether (purified by treatment with sulfuric acid, washing with water, and distillation over a bed of sodium hydroxide) | 120 lbs. |
| Catalyst sufficient to contain (prepared as just described) | .0012 lb. (carbon-linked lithium, expressed as lithium metal). |

A 50-gallon nickel-clad autoclave provided with an anchor-type stirrer was used in this run. The reactor was purged with helium, and the isoprene and petroleum ether charged into the autoclave through a silica gel column. The catalyst was added, agitation was commenced and the temperature adjusted to 120° F., the agitation and temperature being maintained for 43.5 hours, at the end of which time polymerization was complete. The resultant solution was agitated with isopropanol containing an antioxidant to precipitate the polymer, which was then washed with water and dried in an air oven. Infrared analysis indicated the presence of 93.8% cis-1,4-; 0.0 trans-1,4-; 0.0% 1,2-; and 6.2% of 3,4-unsaturation, the total unsaturation found being 86.6%. The polymer had a Mooney value ML/4/212 of 83.5. A specimen cured in a conventional gum stock formulation for 45 minutes at 260° F. had a tensile strength of 3300 pounds per square inch. A specimen cured at 280° F. for 45 minutes in a reinforced formulation containing 25 parts of HAF black per 100 parts of polymer had a room temperature tensile strength of 3825 pounds per square inch, a tensile strength at 212° F. of 3825 pounds per square inch, and an internal friction value of 0.8.

EXAMPLE VIII

*Pentamethylene dilithium temperature and catalyst concentration series*

(A) PREPARATION OF CATALYST

Lithium dispersion (35% dispersion in petrolatum) _____ 20 g. (1.0 gram-atom).
Diethyl ether _____ 500 ml.
Pentamethylene dichloride ____ 35.2 g. (0.25 mol).

The apparatus used comprised a 1 liter, 3-necked flask having two sides pushed in to serve as baffles, and also containing a thermometer well. The center neck of the flask had a high-speed (10,000 r.p.m.) stirrer, and was immersed in a cooling bath. A dropping funnel was inserted on one side neck, and a reflux condenser in the other. The reaction was carried out under argon, which entered the apparatus through an inlet arm on the stirrer and passed down into the flask and out the condenser. The apparatus was flamed and flushed with argon before charging.

The lithium dispersion and diethyl ether was charged, stirring commenced, and the pentamethylene dichloride introduced dropwise over a period of 2.5 hours, while maintaining the temperature in the range 15° C. to 28° C.

The batch was then transferred under argon pressure to a distillation flask in which the diethyl ether was distilled off under reduced argon pressure. Simultaneously, n-heptane was added dropwise. The ether was distilled off to a final pot temperature of 25° C. at 150 mm. absolute pressure. The latter conditions were maintained until a total of 3400 ml. of n-heptane had been added, and the final volume was 500 ml., the difference having been distilled through as a chaser. The resultant preparation was pressured over into a storage bottle previously flamed and flushed with argon. Titration with acid indicated that the concentration of carbon-bonded lithium, expressed as lithium metal, was 0.0060 gram per ml.

(B) POLYMERIZATION

Isoprene (purified as in preceding example) _____ 100 grams.
Petroleum ether (purified as in preceding example) _____ 300 grams.
Catalyst _____ Per Table III.

A series of polymerizations was run in accordance with the above recipe, varying the catalyst concentration and temperature from run to run as set forth in Table III below. In each run, the isoprene, petroleum ether, and selected amount of catalyst were charged and sealed into a 28-ounce beverage bottle with an aluminum-foil-lined crown cap, the bottle having previously been flamed and flushed with helium. The bottle was then tumbled on a polymerizer wheel in a water-bath at the temperature selected for the run for 48 hours. The resultant polymer solution was agitated with isopropanol containing an antioxidant to precipitate the polymer, which was then washed with water on a wash mill and dried in a vacuum oven. Tabulated herewith are the temperatures and concentrations of catalyst in the several runs, together with the infra-red analysis of the corresponding polymers produced.

*Table III*

| Run No. | Temp. (° C.) | Catalyst (g.)* | Infra-Red Analysis | | | | |
|---|---|---|---|---|---|---|---|
| | | | Cis-1,4- | Trans-1,4- | 1,2- | 3,4- | Total Found |
| 1 | 30 | .008 | 94.3 | 0.0 | 0.0 | 5.7 | 91.6 |
| 2 | 50 | .008 | 91.4 | 2.1 | 0.0 | 6.5 | 92.5 |
| 3 | 70 | .008 | 87.7 | 3.6 | 0.0 | 8.7 | 87.0 |
| 4 | 50 | .005 | 93.2 | 0.0 | 0.0 | 6.8 | 93.4 |
| 5 | 50 | .0023 | 92.8 | 0.0 | 0.0 | 7.2 | 92.1 |

* Amount of catalyst used, as grams of carbon-linked lithium, expressed as lithium metal.

The sequence of runs 1–3 illustrate the improvement of structure with decreasing temperatures, and the sequence of runs 2, 4 and 5 show the improvement with lower concentration of catalysts.

EXAMPLE IX

*Trimethylene dilithium*

Isoprene (distilled over sodium metal) _____ 60 grams.
Pentane (purified by treatment with sulfuric acid, washing with water and distillation over potassium hydroxide) _____ 340 grams.
Trimethylene dilithium catalyst, sufficient to contain __ .024 gram of carbon-linked lithium, expressed as metallic lithium.

The isoprene, pentane, and catalyst were charged and sealed into a 28-ounce beverage bottle with an aluminum-foil-lined crown cap, the bottle having been previously flamed and flushed with helium. The bottle was then placed on a polymerizer wheel in a water bath at 50° C. and rotated for 15 hours. The polymer was recovered by precipitation with isopropanol containing an antioxidant, washing on a wash mill with water, and drying in an oven at 50° C. Infra-red analysis indicated the presence of 78.8% cis-; 12.2% trans-; 0.0% 1,2-; and 9.0% 3,4-unsaturation, the total unsaturation found being 89.5%.

EXAMPLE X

*Hexamethylene dilithium*

The procedure of the preceding example was exactly repeated, except that a hexamethylene dilithium catalyst, in an amount sufficient to provide .0018 gram of carbon-linked lithium, expressed as lithium metal, was used in place of the trimethylene dilithium. A polymer of excellent rubbery properties was obtained, showing on infrared examination 95.1% cis-; 0.0% trans-; 0.0% 1,2-; 4.9% 3,4-; the total unsaturation found being 98.3.

EXAMPLE XI

*Decamethylene dilithium catalyst*

Isoprene [1] _____ 97 ml. (66 g.)
Petroleum ether [2] _____ 412 ml. (264 g.)
Decamethylene dilithium suspension (1 ml. contains .0068 g. of carbon-linked Li as determined by titration) _____ 1.0 or 10.0 ml. (per Table IV).

[1] "Pure Grade" 99% isoprene, supplied by the Phillips Petroleum Company. Refluxed 2 hours over sodium metal, and then distilled, a 20% forerun being discarded. Tollens test negative after two hours.
[2] Boiling range 25–65° C., stirred with concentrated H₂SO₄ until retest with new acid showed no discoloration, then distilled from flake KOH and passed through an alumina column.

Two polymerization runs were made in accordance with the foregoing schedule, one using 1.0 and the other 10.0 ml. of the decamethylene dilithium suspension. In each case there was provided a 28-ounce beverage bottle which had previously been baked in an oven and which contained a magnetic stirring bar. The petroleum ether (together with an excess of 50 ml. of the petroleum ether to make up for venting losses) was charged into the bottle, which was then warmed on a sand bath to boil off a portion of the petroleum ether to purge the bottle. The isoprene was then charged, the bottle rewarmed to effect further purging, the selected amount of catalyst injected, and the bottle quickly sealed, while still boiling, with a crown cap provided with an aluminum foil inner liner. The bottle was then placed on a magnetic stirrer in a room at 27° C. The progress of the polymerization was observed, and when it appeared to have come to a standstill, the bottle was opened and 150 ml. of isopropanol containing an antioxidant were mixed in and let stand for 18 hours. The bottle was then cut open, and the coagulated rubbery polymer removed, washed on a mill with water, and dried in a vacuum oven at 50° C. Following are the particulars of the runs, and the infra-red analyses of the products.

Table IV

| Run No. | Ml. of decamethylene dilithium suspension | Yield of Polymer (g.)* | Conversion (percent) | Infra-Red Analysis (Percent Unsaturation) | | | | |
|---|---|---|---|---|---|---|---|---|
| | | | | Cis-1,4- | Trans-1,4- | 1,2- | 3,4- | Total Found |
| 1 | 1.0 | 55.5 | 84.1 | 94.6 | 0.0 | 0.0 | 5.5 | 94.4 |
| 2 | 10.0 | 21.7 | 32.9 | 94.3 | 0.4 | 0.0 | 5.3 | 92.6 |

*0.4 gram subtracted to allow for antioxidant in polymer.

EXAMPLE XII

1-phenyl-1,4-dilithium-2,5-cyclohexadiene catalyst (A) PREPARATION OF CATALYST

| | |
|---|---|
| Biphenyl (b.p. 247–8° C./ 734.5 mm.; M.P. 69.6° C.) | 30.84 grams (0.200 mol). |
| Lithium metal (hammered out into foil) | 2.776 grams (0.400 gram-atoms). |
| Diethyl ether | 125 ml. |

The following preparation, and the preparation in Example XIII–A below are substantially in accordance with procedure of Schlenk and Bergmann Ann. 463, 1 (1928). A cylindrical bomb of stainless steel having a 3-inch inside diameter and 7.5-inch interior length containing ten ½-inch by 7-inch stainless steel rods was provided for the experiment. The above ingredients were charged into the bomb, the interior purged with argon, and the bomb sealed. The bomb was then placed upon a roller cradle operating at 3 turns per second in an environment maintained at 25° C. At the end of 72 hours, further argon was injected to bring the interior pressure up to 5 p.s.i.g. At the end of a total of 308 hours of rotation, the bomb was opened and found to contain a brown, muddy slurry resembling apple butter. This was transferred by means of about 800 ml. of ether to a one-liter, three-neck flask. Quantitative transferral was not possible because of inflammability difficulties. The flask was then set up for distillation, and 500 ml. of ether distilled off in a current of argon. Twelve hundred ml. of heptane were then introduced and the rest of the ether chased off under vacuum, the temperature never being allowed to rise over 36° C. The heptane was taken off up to a temperature of 30° C. (pot and still) at 65 mm. The remaining slurry was transferred, together with an additional heptane, into a 28-ounce bottle provided with a crown cap having an aperture for hypodermic withdrawal of contents, the total volume of slurry in the bottle being 775 ml. Apparently all of the lithium had reacted, as no lithium came to the surface on settling for 15 hours. All of the brown precipitate was heavier than heptane. The sample of the slurry was titrated with hydrochloric acid against phenolphthalein, and was found to contain 0.003154 gram of titratable lithium per milliliter. This slurry was used as the catalyst in the experiment to follow.

(B) POLYMERIZATION

| | |
|---|---|
| Isoprene [1] | 100 g. |
| Petroleum ether [2] | 300 g. |
| 1-phenyl-1,4-dilithium-2,5-cyclohexadiene suspension (1 ml. contains .003 g. of lithium base as determined by acid titration) | 1.3 mil. (.004 g. of carbon-linked lithium). |

[1] Purified by treatment with copper soap-maleic anhydride process, then refluxed 3.5 hours over sodium and distilled into a receiver containing 0.03% of N,N'-dioctyl paraphenylene diamine as an antioxidant, based on the weight of isoprene.
[2] Purified as in Example XI.

The isoprene and petroleum ether were premixed and passed through a 14" x 48 mm. alumina column into a 28-ounce beverage bottle. The botle was heated on a sand bath to evaporate a small portion of the contents to purge the bottle, whereupon the catalyst suspension was injected and the bottle quickly capped with an aluminum-foil-lined crown cap, and placed upon a polymerizer-wheel which revolved and dipped the bottle in a water bath at 50° C. At the end of 4.5 hours, polymerization seemed to be complete, and the bottle was removed from the wheel, cooled, vented and cut open, and the contents dropped into isopropanol. The coagulated polymer was then washed on a mill with water and 0.5 g. of an antioxidant added. There were obtained 90.1 grams (0.5 gram subtracted to allow for antioxidant) of a rubbery polymer which showed on infra-red analysis 83.4% cis-1,4-; 7.1% trans-1,4-; 0.0% 1,2- and 9.5% 3,4-unsaturation, the total unsaturation found being 85.2%.

EXAMPLE XIII

1-phenyl-1,4-dilithium-2,5-cyclohexadiene catalyst-low temperature (A) PREPARATION OF CATALYST

| | |
|---|---|
| Biphenyl (b.p. 247–8° C./ 734.5 mm.; M.P. 69.6° C.) | 61.68 grams (4.00 mol) |
| Lithium paste (34.61% dispersion in petrolatum) | 16.04 grams (0.800 gram-atom). |
| Diethyl ether (dried over sodium) | 250 ml. |

In this experiment there was used a stainless steel rocker bomb of 3-inch inside diameter and 14.8-centimeter depth charged with 60 one-half-inch stainless steel ball bearings. The above ingredients were charged into the bomb, which was then flushed out with argon, sealed, and rocking initiated at the rate of 36 cycles per minute at 25° C. At the end of 68 hours, 500 ml. of dry heptane were added and the bomb was re-pressured with argon. The contents were then transferred into a 2-liter flask by turning the rocker bomb upside down, opening the valve and allowing the gas pressure to blow the slurry into the flask, in which an atmosphere of nitrogen was maintained. The bomb was flushed by running in another 500 ml. of dried purified heptane, re-pressuring and blowing the bomb again into the flask. The flask was then set up in a distillation apparatus and the solvents distilled therefrom under reduced pressure in a flow of argon. At the start, the contents were distilled at 146 ml. pressure and 25° C. During the distillation an additional 250 ml. of dried purified heptane were added, never allowing the batch temperature to exceed 37° C. At 74 ml. pressure, pot temperature had risen to 29° C. and distillation continued, to leave a volume of about 700 ml. in the flask. At the end of distillation, pressure was 67 mm. pot temperature 33° C.

The residue in the flask was rinsed with three 250 ml. washes of dried purified heptane into a 28-ounce bottle under a current of nitrogen, and the bottle then sealed with a crown cap provided with a perforation for hypodermic withdrawal of contents. A sample of the contents was then titrated with hydrochloric acid against methyl orange and indicated 0.007336 gram of titratable lithium per ml. This preparation was used in the polymerization to follow.

(B) POLYMERIZATION

| | |
|---|---|
| Isoprene [1] | 80 grams. |
| Petroleum ether [1] | 320 grams. |
| 1 - phenyl-1,4-dilithium-2,5-cyclohexadiene suspension (1 ml. contains .0073 g. of carbon-bound lithium as determined by acid titration) | 0.44 or 0.22 ml. (per Table V). |

[1] Both purified as in Example XII.

Two runs were made in accordance with the above recipe, varying the amount of catalyst as set forth below in Table V. In each case the ingredients of the recipe were charged into a 28-ounce beverage bottle as described in Example XII. This bottle contained a magnetic stirring bar. The bottle was then placed upon a magnetic stirrer in a room at 23° C. for 48 hours. At the end of this time the bottle was removed and the rubbery polymer recovered therefrom as described in Example XII. Following are particulars of the individual runs.

Table V

| Run No. | Catalyst Used | | Yield of Polymer, Grams | Percent Conversion | Infra-Red Analysis (Percent Unsaturation) | | | | |
|---|---|---|---|---|---|---|---|---|---|
| | Ml. of suspension | Grams of Li per 100 g. of Isoprene | | | Cis-1,4- | Trans-1,4- | 1,2- | 3,4- | Total Found |
| 1 | 0.44 | .004 | 68.0 | 85.2 | 90.0 | 3.3 | 0.0 | 6.7 | 87.2 |
| 2 | 0.22 | .002 | 68.8 | 86.0 | 93.5 | 0.0 | 0.0 | 6.2 | 87.7 |

From the foregoing general discussion and detailed specific examples, it will be evident that this invention provides a novel method for the production of synthetic polyisoprenes closely approximating natural Hevea rubber. The polylithium compound catalysts, in the amounts used in the process, are a negligible expense, and the process involves the use only of inexpensive and readily secured apparatus.

What is claimed is:

1. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of $-100°$ C. to 150° C., isoprene with a hydrocarbon polylithium compound in which the hydrocarbon group contains 1–40 carbon atoms, the amount of said hydrocarbon polylithium compound being sufficient to provide not more than 0.1 gram of carbon-linked lithium, expressed as lithium metal, for each 100 grams of isoprene, and the isoprene being substantially free from ethers, esters, aldehydes, ketones and primary and secondary amines.

2. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of $-100°$ C. to 150° C., isoprene with an alkylene dilithium compound in which the alkylene group contains 1–18 carbon atoms, the amount of said alkylene dilithium compound being sufficient to provide from about 0.00002 gram to 0.02 gram of carbon-linked lithium for each 100 grams of isoprene, and the isoprene being substantially free from ethers, esters, aldehydes, ketones and primary and secondary amines.

3. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of $-100°$ C. to 150° C., isoprene with pentamethylene dilithium, the amount of said pentamethylene dilithium being sufficient to provide from about 0.00002 gram to about 0.02 gram of carbon-linked lithium for each 100 grams of isoprene, and the isoprene being substantially free from ethers, esters, aldehydes, ketones and primary and secondary amines.

4. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of $-100°$ C. to 150° C., isoprene with hexamethylene dilithium, the amount of said hexamethylene dilithium being sufficient to provide from about 0.00002 gram to about 0.02 gram of carbon-linked lithium for each 100 grams of isoprene, and the isoprene being substantially free from ethers, esters, aldehydes, ketones and primary and secondary amines.

5. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of $-100°$ C. to 150° C., isoprene, in solution in an inert solvent, with a hydrocarbon dilithium compound, in which the hydrocarbon group contains 1–40 carbon atoms, the amount of said hydrocarbon dilithium compound being sufficient to provide from about 0.00002 gram to about 0.02 gram of carbon-linked lithium for each 100 grams of isoprene, and the isoprene being substantially free from ethers, esters, aldehydes, ketones and primary and secondary amines.

6. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., isoprene, in solution in an inert solvent, with an alkylene dilithium compound in which the alkylene group contains 1–18 carbon atoms, the amount of said alkylene dilithium compound being sufficient to provide from about 0.00002 gram to about 0.02 gram of carbon-linked lithium for each 100 grams of isoprene, and the isoprene being substantially free from ethers, esters, aldehydes, ketones and primary and secondary amines.

7. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., isoprene, in solution in an inert solvent, with pentamethylene dilithium, the amount of said pentamethylene dilithium being sufficient to provide from about 0.00002 gram to about 0.02 gram of carbon-linked lithium for each 100 grams of isoprene, and the isoprene being substantially free from ethers, esters, aldehydes, ketones and primary and secondary amines.

8. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., isoprene, in solution in an inert solvent, with hexamethylene dilithium, the amount of said hexamethylene dilithium being sufficient to provide from about 0.00002 gram to about 0.02 gram of carbon-linked lithium for each 100 grams of isoprene, and the isoprene being substantially free from ethers, esters, aldehydes, ketones and primary and secondary amines.

9. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., isoprene with tetramethylene dilithium, the amount of said tetramethylene dilithium being sufficient to provide from about 0.00002 gram to about 0.02 gram of carbon-linked lithium for each 100 grams of isoprene, and the isoprene being substantially free from ethers, esters, aldehydes, ketones and primary and secondary amines.

10. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., isoprene, in solution in an inert solvent, with tetramethylene dilithium, the amount of said tetramethylene dilithium being sufficient to provide from about 0.00002 gram to about 0.02 gram of carbon-linked lithium for each 100 grams of isoprene, and the isoprene being substantially free from ethers, esters, aldehydes, ketones and primary and secondary amines.

11. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., isoprene with decamethylene dilithium, the amount of said decamethylene dilithium being sufficient to provide from about 0.00002 gram to about 0.02 gram of carbon-linked lithium for each 100 grams of isoprene, and the isoprene being substantially free from ethers, esters, aldehydes, ketones and primary and secondary amines.

12. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., isoprene, in solution in an inert solvent, with decamethylene dilithium, the amount of said decamethylene dilithium being sufficient to provide from about 0.00002 gram to about 0.02 gram of carbon-linked lithium for each 100 grams of isoprene, and the isoprene being substantially free from ethers, esters, aldehydes, ketones and primary and secondary amines.

13. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., isoprene with 1-phenyl-1,4-dilithium-2,5-cyclohexadiene, the amount of said 1-phenyl-1,4-dilithium-2,5-cyclohexadiene being sufficient to provide from about 0.00002 gram to about 0.02 gram of carbon-linked lithium for each 100 grams of isoprene, and the isoprene being substantially free from ethers, esters, aldehydes, ketones and primary and secondary amines.

14. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., isoprene, in solution in an inert solvent, with 1-phenyl - 1,4 - dilithium - 2,5 - cyclohexadiene, the amount of said 1-phenyl-1,4-dilithium-2,5-cyclohexadiene being sufficient to provide from about 0.00002 gram to about 0.02 gram of carbon-linked lithium for each 100 grams of isoprene, and the isoprene being substantially free from ethers, esters, aldehydes, ketones and primary and secondary amines.

15. Process of polymerizing isoprene to form essentially cis-polymers showing by infrared technique at least about 75% cis-1,4-structure, a maximum of about 7 to 10% trans-1,4-structure, a maximum of about 10% 3,4-structure, and substantially no 1,2-structure which comprises contacting, at temperatures in the range of −100° C. to 150° C., the isoprene wtih a hydrocarbon polylithium compound selected from the group consisting of methylene dilithium, ethylene dilithium, trimethylene dilithium, tetramethylene dilithium, pentamethylene dilithium, hexamethylene dilithium, decamethylene dilithium, octamethylene dilithium, 1,2-dilithium propane, 1,4-dilithium benzene, 1,5-dilithium naphthalene, 1,2-dilithium-1,3-triphenyl propane, the compound of the formula

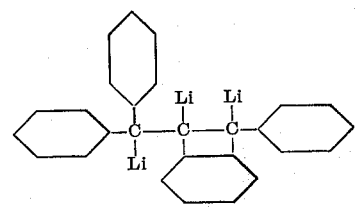

1,3-trilithium pentane, 1,3,5-trilithium benzene and mixtures thereof with other lithium-dependent catalysts, the amount of said hydrocarbon polylithium compound being sufficient to provide not more than 0.1 gram of carbon-linked lithium, expressed as lithium metal, for each 100 grams of isoprene, and the isoprene being substantially free from ethers, esters, aldehydes, ketones and primary and secondary amines.

References Cited by the Examiner

UNITED STATES PATENTS

| | | | |
|---|---|---|---|
| 2,048,169 | 7/36 | Scott | 260—94.2 |
| 2,146,447 | 2/39 | Scott | 260—94.2 |
| 2,568,950 | 9/51 | Crouch | 260—94.2 |
| 2,849,432 | 8/58 | Kibler et al. | 260—94.2 |

FOREIGN PATENTS 339,243   12/30   Great Britain.

OTHER REFERENCES

Ziegler: "Ruber Chem. and Tech." (1938), pp. 501–07, translated from Chemiker-Zeitung, vol. 62, No. 14, pp. 125–27, Feb. 16, 1938.

WIILLIAM H. SHORT, *Primary Examiner.*

UNITED STATES PATENT OFFICE
CERTIFICATE OF CORRECTION

Patent No. 3,208,988                 September 28, 1965

Lawrence E. Forman et al.

It is hereby certified that error appears in the above numbered patent requiring correction and that the said Letters Patent should read as corrected below.

Column 1, line 17, for "Serial No. 535,525" read -- Serial No. 535,255 --.

Signed and sealed this 17th day of January 1967.

(SEAL)
Attest:

ERNEST W. SWIDER                      EDWARD J. BRENNER
Attesting Officer                         Commissioner of Patents